United States Patent

[11] 3,571,752

[72] Inventor Rudolph J. Sturm, Jr.
St. Paul, Minn. (306 E. Sumner St., Northfield, Mass. 55057)
[21] Appl. No. 760,281
[22] Filed Sept. 17, 1968
Division of Ser. No. 314,727, Oct. 8, 1963, Pat. No. 3,441,842
[45] Patented Mar. 23, 1971

[54] TRANSFORMER COUPLED MULTI VIBRATOR PULSE GENERATOR FOR FAULT DETECTION
7 Claims, 2 Drawing Figs.

[52] U.S. Cl. .................................................. 331/113,
321/2, 321/44, 324/52
[51] Int. Cl. ................................................. H03k 3/30
[50] Field of Search ..................................... 331/113.1,
113; 321/44, 2; 324/51, 52

[56] References Cited
UNITED STATES PATENTS
3,008,068 11/1961 Wilting et al. ................. 331/113.(1X)

FOREIGN PATENTS
594,311 3/1960 Canada ........................ 331/113.1

OTHER REFERENCES
Butler, "Transistor Inverter and Rectifier-Filter Units," ELECTRONIC ENGINEERING, July 1959, pp. 412— 418. (331— 113.1)

Primary Examiner—Roy Lake
Assistant Examiner—Siegfried H. Grimm
Attorney—Hill, Sherman, Meroni, Gross and Simpson ABSTRACT: An AC pulse generator for use in line fault detection is constructed as a manually portable transistorized multivibrator for producing a distinctive signal having a pip, which is applied to the circuit under test. Doing so produces unbalanced currents which produce a net magnetic field along the current path, which can then be detected.

PATENTED MAR 23 1971
3,571,752
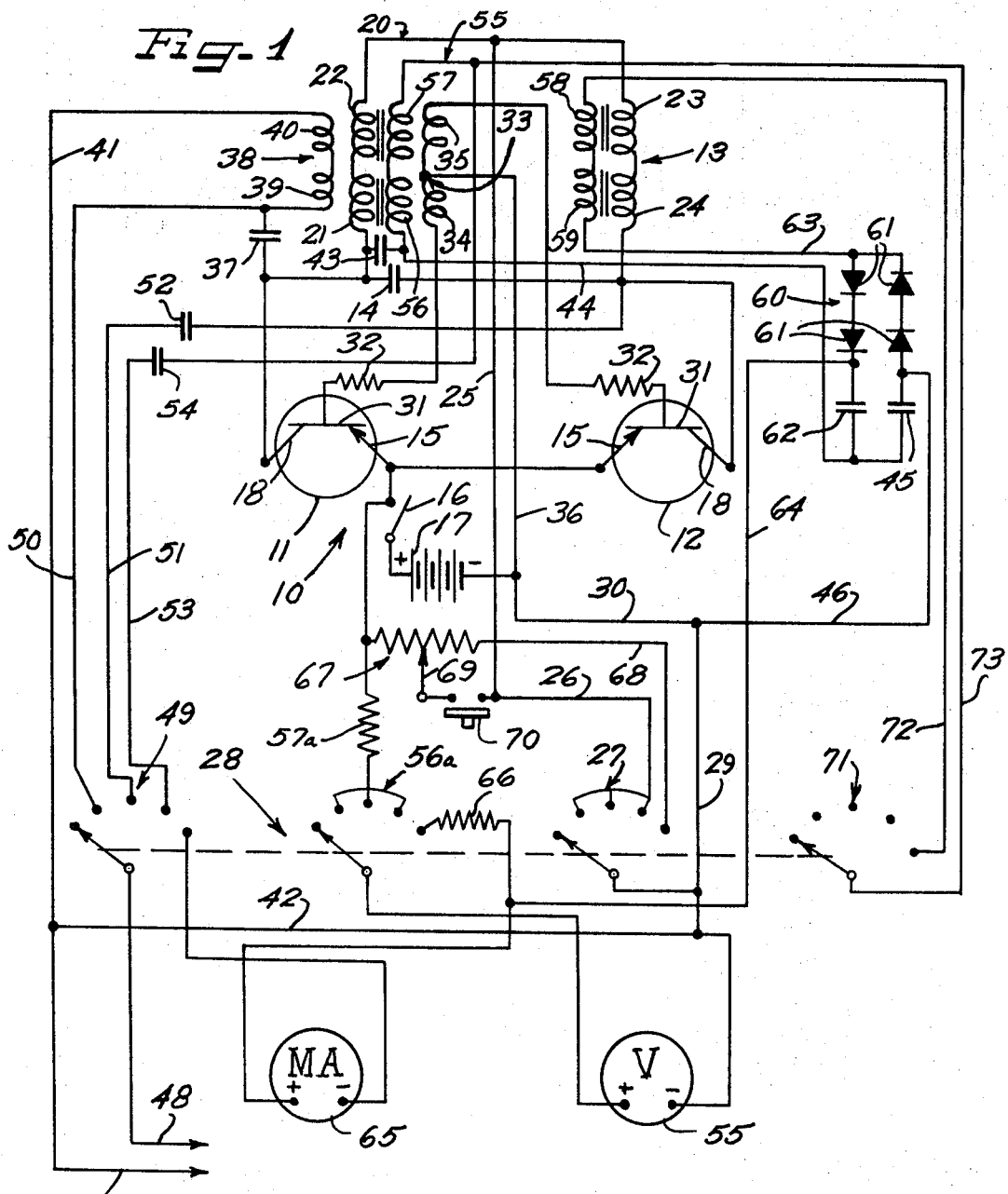
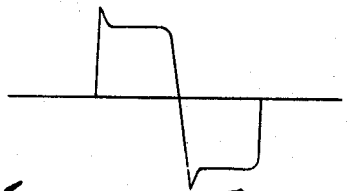
INVENTOR.
Rudolph J. Sturm, Jr.
ATTORNEYS

3,571,752

TRANSFORMER COUPLED MULTI VIBRATOR PULSE GENERATOR FOR FAULT DETECTION

This application is a division of my copending application Ser. No. 314,727, filed Oct. 8, 1963 now U.S. Pat. No. 3,441,842.

This invention relates to an AC pulse generator for use in detecting the location of a short in a shorted circuit.

Various kinds of test equipment have been provided by which the location of a circuit may be detected. When the circuit under test is located physically adjacent to many other circuits which may then be energized, or when the circuit under test is located on a structure embodying a considerable amount of steel, or when both such conditions are present as in a diesel-electric locomotive, the problems involved in finding such circuit or short are greatly multiplied. One such type of test equipment, which has been used to locate shorts or unwanted grounds in railroad locomotives and has a cost near $5,000.00, is mounted on a cart that needs the power of one man to push it across tracks to the locomotive to be tested, and contains a transformer which must be connected to a commercial source of alternating current. Such known equipment is of relatively low sensitivity, draws about 1 kilowatt of power, and may deliver a current at a voltage up to 2,000 volts. The high voltage leads are connected to the faulty electric circuit, while another portion of the equipment is carried about by means of a shoulder strap to enable a rather heavy sensing coil to follow the circuitry to the fault. I am aware of two fatal accidents that have occurred as a direct result of use of this type of equipment.

The present invention is directed to a small, portable, self-powered, lightweight source of current which can be housed in a cabinet the size of which is about a 5 inch cube and which weighs less than 5 pounds. This current source is safe to both the user and to the equipment being tested since the power it delivers is usually less than 1 watt. The means by which current is applied to the circuit being tested is unique in that it comprises a composite AC pulse which preferably is rich in harmonics.

Accordingly, it is an object of the present invention to provide a novel signal source for use in detecting the location of shorts, grounds, or circuits.

A still further object of the present invention is to provide a signal source by which the location at which a conductor enclosed within a steel conduit and shorted to such conduit can be identified.

Another object of the present invention is to provide a novel signal source enabling detecting the location of a short between a pair of physically parallel conductors in a shorted circuit.

Yet another object of the present invention is to employ a harmonically rich signal source to produce magnetic fields in one conductor which are not entirely cancelled by the adjacent field of another parallel conductor of the transmission line.

A still further object of the present invention is to provide an AC pulse generator.

Another object of the present invention is to provide testing means of the type described which can be employed while adjacent circuitry is left energized.

Another object of the present invention is to provide a pulse generator which is portable, small, self-powered, lightweight, low-powered, and safe to both the user and to the equipment being tested.

Another object of the present invention is to provide test equipment of the type described for testing circuits of low resistance, and for testing circuits which have an unwanted resistance to ground of up to approximately 75,000 ohms.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

FIG. 1 is a schematic diagram of the generator portion of a circuit testing device provided in accordance with the principles of the present invention; and FIG. 2 is an oscillogram of a signal provided by the circuit of FIG. 1.

AS SHOWN ON THE DRAWINGS

The principles of the present invention are particularly useful when embodied in a signal source such as shown in FIG. 1, which is a circuit diagram of a signal generator which is constructed to provide alternating current pulses or signals, and preferably also to supply high voltage direct current. For the purpose of this invention, it is essential that the alternating current signal be other than sinusoidal, and to this end, a structure is provided by which there is produced a substantially square wave having a spike at the leading edge of each pulse. The circuit in FIG. 1 shows a representative structure by which such a signal may be provided. Accordingly, there is provided a multivibrator 10 which includes a direct current powered pair of transistors 11, 12, a transformer 13, and a capacitor 14.

Each of the transistors 11 and 12 has an emitter 15 connected through an on-off switch 16 to the positive terminal of a battery 17. Each of the transistors 11 and 12 has a collector 18, such collectors 18 being connected together by a primary winding 20 of the transformer 13. The primary winding 20 includes a number of coils 21—24 connected in series. The collectors are also respectively connected to opposite sides of the capacitor 14.

The primary winding 20 is center-tapped, and is connected by leads 25 and 26, through a section 27 of a selector switch generally indicated at 28, and through leads 29 and 30 to the negative terminal of the battery 17.

The transistors 11 and 12 each have a base 31 respectively connected to one of a pair of resistors 32, 32, which are connected respectively to opposite ends of a center-tapped regenerative or tickler winding 33. The winding 33 serves as a control winding for regulating the bias potential present on each of the bases 31, and comprises a pair of coils 34, 35. The center-tap of the winding 33 is connected by a lead 36 to a point of reference, here indicated as being the negative terminal of the battery 17.

When the switch 16 is first moved to a closed position, neither of the bases 31 is biased to block current flow therethrough. Thus, current tends to flow from the positive terminal of the battery 17 through the switch 16, through each of the emitters 15, and through each of the collectors 18, the current flowing through the transistor 11 tending to flow through the coils 21 and 22 of the primary winding 20 to ground or negative battery terminal in one direction, while the current flowing through the transistor 12 tending to flow through the coils 23 and 24 of the same winding to ground or negative battery terminal in the opposite direction. This tendency creates a state of stability which is undesirable. To upset or unbalance such state of stability, there is provided a low impedance capacitive connection from one end of the primary winding 20 to the center-tap thereof, which is at the potential of the negative terminal of the battery 17. To this end, a capacitor 37 is provided which has one side thereof connected to the line which connects the coil 21 to the collector 18, and the other side of the capacitor 37 is connected through a secondary winding 38, consisting of a pair of coils 39 and 40, and thence through a pair of lines 41 and 42 to the line 29, and hence through the line 30 to the negative terminal of the battery 17.

It will be appreciated that as the operation of transistor 11 is dependent upon induced voltages in winding 34, and operation of transistor 12 is dependent upon induced voltages in the winding 35, maintenance of an induced control voltage on either transistor base is dependent upon the continuation of a current change in the operative primary winding 21—22 or 23—24, and if such current reaches a limiting constant value, for any reason, induced control voltages in windings 34 and 35 will cease as a result of the absence of a flux change.

Such limiting current value may be derived in any suitable manner in accordance with prior known multivibrator techniques, as for example, by transistor saturation, transformer core saturation or by limiting the transistor base driving power to a predetermined maximum value.

Consequently, upon closure of switch 16, voltage from the battery 17 is applied to both transistor circuits and current will tend to flow in both circuits. However, as a result of the presence of capacitor 37, current flow in the winding 21—22 will be delayed by charging of such capacitor, while simultaneously with such switch closing current will immediately flow in winding 23—24. Such current flow will produce an induced voltage in each winding 35, 34 that in winding 35 having a polarity biasing the transistor 12 in a conductive direction and that in winding 34 biasing transistor 11 in cutoff direction, whereby transistor 12 will always dominate such initial operation.

The operation continues in this manner until the current flowing through winding 23—24, in dependence upon the circuit parameters, reaches said limiting value and resulting in the disappearance in the induced voltages in the windings 34 and 35. Upon discontinuance of the cutoff bias on the base of transistor 11, current will begin to flow in the winding 21—22, resulting in the production of induced voltages in control windings 34, 35 but now of reverse polarity to the initial voltages therein. Induced voltage in winding 35 now promotes conduction of transistor 11 and decreases that of transistor 12, such action continuing until transistor 12 is cutoff and the current of transistor 11 reaches the limiting value, whereupon the operation will again be reversed.

The multivibrator 10 thus has one astable or quasi-stable state wherein the transistor 12 is conductive and the transistor 11 is blocking, and a second astable or quasi-stable state wherein the transistor 11 is conducting and the transistor 12 is blocking. The primary winding 20 together with the capacitor 14 comprise a circuit which, because of the coaction of the tickler winding 33, switches back and forth between these two astable states.

The other or third state of stability initially described is thus intermediate the astable states and is eliminated or upset by the low impedance capacitive connection including the capacitor 37 through the secondary 38.

In this embodiment, there is a further low impedance capacitive connection which serves a similar function as the amount of delay will be determined by the total effective shunt capacity creating the circuit asymmetry. To this end, a capacitor 43 has one side which is connected to the same line as the capacitor 37, namely between the collector 18 of the transistor 11 and the coil 21. The capacitor 43 is connected at its other side through a line 44 and through a further capacitor 45 and a line 46 to the line 30 and hence to the negative terminal of the battery 17. Thus, a further current delaying path is provided to upset the state of stability which otherwise would be present at the starting of the multivibrator 10.

The wave form of the signal induced at various points in the output transformer 13 is substantially that shown in FIG. 2, it being understood that the voltages at such various points would differ, and the height of the spike being determined by the size of the capacitor 14.

A power outlet terminal is provided which includes a conductor 47 connected through the lines 42, 29, and 30 to the negative terminal of the battery 17, and a conductor 48 which is connected to the movable element of a further section 49 of the selector switch 28. The illustrated position of the selector switch 28 represents an off position thereof. The second terminal thereof is connected by a line 50 to the secondary winding 38 which is a high current, low voltage winding, a typical potential being 0.2 volts. The next terminal to which the selector switch 28 may be positioned is connected through a line 51 and a coupling capacitor 52 to the high voltage side of the coils 23, 24 of the primary winding 20. A typical voltage available at this tap is 45 volts. The fourth tap of the selector switch portion 49 is connected by a line 53 and a coupling capacitor 54 to the center-tap of a secondary winding 55, composed of four coils 56—59. At this point, a potential of 120 volts is typically available.

In use, the power outlet terminals 47, 48 are connected to the shorted circuit to be tested, which may have a very low impedance, or which may have a relatively high impedance, such as 75,000 ohms. The selector switch 28 is then positioned to approximately match the impedance of the signal source with the line to be tested as described later herein. An indication of strength of the battery 17 is provided by a voltmeter 55, the positive terminal of which is connected through a section 56a of the selector switch 28 and through a multiplier or range resistor 57a and the switch 16 to the positive terminal of the battery 17. The negative terminal of the voltmeter 55 is connected through the lines 29 and 30 to the negative terminal of the battery 17.

The output transformer 13 has laminations in the form of a hollow square. The coils 39, 21, 56, 34, 59, and 24 are disposed or wrapped about one leg of such square, while the coils 40, 22, 57, 35, 58, and 23 are wound about the opposite leg thereof. Each of the primary coils 21—24 comprises 25 turns of two No. 29 wires wound and connected in parallel. Each of the secondary winding coils 56—59 comprises 900 turns of No. 40 wire. Each of the coils 39, 40 of the secondary winding 38 comprises three turns of No. 20 wire. The tickler winding 33 comprises one center-tapped coil having 60 turns of No. 29 wire.

In addition to providing the nonsinusoidal periodic signal or pulse such as indicated in FIG. 2, the generator may be utilized to provide a source of high voltage direct current for conducting leakage tests. To this end, there is provided rectifier means indicated at 60, comprising a fullwave voltage doubling rectifier circuit including four rectifiers 61, the capacitor 45, and a further capacitor 62. One side of each of the capacitors 45 and 62 is connected by the line 44 to one side of the secondary winding 55, and the other side of the secondary winding 55 is connected by a line 63 to the opposite point in the bridge. The line 46, having a negative polarity from the battery 17, is connected between the capacitor 45 and the adjacent rectifier, while a line 64 is connected between the capacitor 62 and its adjacent rectifier 61. The line 64 passes in series through a milliammeter 65 and thence to a fifth tap on the selector switch section 49 for connection to the power outlet terminal 48. Placing the selector switch 28 in this position thus disconnects the transformer winding from the power outlet terminal and connects the rectifier means 60 thereto. Such positioning also disconnects the positive terminal of the voltmeter 55 from the range resistor 57a and connects it to a range resistor 66 of somewhat higher value which is connected to the line 64.

When the generator is used as a source of AC pulses the center-tap of the primary winding 20 is connected through the second, third, and fourth taps of the selector switch section 27, and thence through the lines 29 and 30 to the negative terminal of the battery 17. When the generator is used as a source of high voltage direct current, with the selector switch in the fifth position, the foregoing connection for the center-tap is interrupted, and in place of the direct connection thus afforded between the battery 17 and the multivibrator 10, there is inserted in such center-tap line 25 an adjustable voltage divider 67 in the nature of a potentiometer. One side of the potentiometer 67 is connected through the switch 16 to the positive terminal of the battery 17, and the other side of the potentiometer 67 is connected through a line 68, through the selector switch section 27 and the lines 29 and 30 to the negative terminal of the battery 17. Thus, the entire battery voltage appears across the potentiometer winding. The potentiometer includes a slider 69 connected through a momentary switch or push button 70 to the line 25. With the selector switch in the fifth position, and with the switch 16 closed, the multivibrator circuit is incomplete until the button 70 is depressed. Upon depressing such button, and depending upon the position of the slider 69, a variable or adjustable potential is applied to the multivibrator, by raising the potential of the center-tap of the primary winding with respect to the negative terminal of the battery 17.

In AC operation of the device, the coils 58 and 59 float, but for DC operation, a fourth section 71 of the selector switch 28 closes a pair of lines 72, 73 connecting the center-tap of the secondary winding 55 to the coil 58, by which a relatively high voltage alternating current is made available for rectification by the rectifier means 60.

The power outlet terminals 47 and 48 are connected to the shorted circuit in such manner that current flows through the short therein. Assume that a transmission line or pair of conductors is disposed within a steel conduit, there being electrical continuity from the one to the other at a point comprising a short. If alternating current of commercial wave form and frequency is caused to flow in a completed circuit including the pair of conductors, the magnetic field in the one conductor is cancelled by the magnetic field in the other conductor. So also, when such current flows in the one conductor and in the conduit through the short, the field in one conductor of such parallel transmission line is for all practical purposes cancelled by the field produced by the current in the other conductor or conduit of such transmission line. (The term "transmission line" as used herein is employed in a broad sense to include parallel wiring in general and its conduit, cables, and the like, and should not be construed in a restrictive sense. Thus, the configuration and number of conductors may vary considerably.)

However, in accordance with the principles of this invention, when the harmonically rich signal is applied from the terminals 47 and 48 through the short, a somewhat different result occurs of which I take advantage. The velocity of propagation of a signal along a line is a function of its frequency. Therefore, when many frequencies are present as in my signal, individual frequency components do not all move at the same velocity and do not all arrive at the short at the same instant. Therefore, there is a slight difference in magnetic field that makes substantially complete cancellation thereof impossible. Stated otherwise, the nonsinusoidal waveform is produced by a large number of harmonically related sinusoidal currents which are harmonics of the fundamental. These harmonics vary as to amplitude, as to frequency, and as to wavelength with respect to each other so that an external field is produced by the net differences in current between these harmonic components. By Fourier analysis, a wave form or shape may be broken down into a fundamental sinusoidal frequency and a number of its sinusoidal harmonics. However, when they are combined as here, a nonsinusoidal result is present. Where all such harmonics are integral harmonics of the fundamental, which is the situation here described, the output signal appears to be steady.

In the use of my pulse generator for detecting the location of a short, I prefer that at least one of the frequencies present in the nonsinusoidal waveform be one which is within the range of audible frequencies. This facilitates the use of earphones. More specifically, I prefer that the fundamental frequency be within such audible frequency range, and that it be above the highest ambient frequency present which might be expected from any other nearby source of magnetic field produced by alternating current. In many installations, it would thus suffice if the fundamental frequency were distinctly above 60 cycles per second. In equipment where 400 cycles per second is customary, such as in locomotives or as in aircraft, it is therefore preferable that the fundamental be above such frequency, for example 500 cycles per second. The values given herein are those which I have employed to obtain a harmonically rich signal of the wave form shown in FIG. 2 having a fundamental frequency of about 500 cycles per second.

Thus, in use, there is an application of a composite electric current composed of sinusoidal alternating currents of frequencies in harmonic relation to each other, such composite current being applied to the shorted circuit in such manner that the composite current flows through the short itself. Doing so produces unbalanced currents which produce a net magnetic field which extends from the shorted circuit, even though the conductors thereof comprise a parallel transmission line, coaxial cable, or a conductor within a conduit. Thereafter, using an appropriately sensitive detector (described in my aforesaid patent), the resulting magnetic field can be sensed and relative measurements thereof made to indicate the physical limits of such field, and hence the point where the field terminates. Such point is physically defined by the short and is indicated by an abrupt change by a large amount of the relative field strength. The steeper the slope and the sharper the pip, tip, or spike on the waveform the more harmonics are present and the more effective the instrument becomes for my purpose.

The strongest signal sensed by the detector for each of the AC settings of the selector switch 28 indicates the most power transfer, and hence the best matching of the impedance of the signal source with the line to be tested.

Preferably, the maximum voltages available at the outlet terminals 47, 48 are indicated adjacent to the selector switch 28 so that the user is warned against possibly using the same in conjunction with circuit components that might be damaged by application of such a potential.

When the selector switch 28 is in the DC position, the slider 69 is preferably first moved to a minimum voltage position and then the button 70 is depressed. Thereafter, the slider 69 is moved so as to gradually increase the DC voltage and the current to any convenient level indicated on the meters 55 and 65 from which the DC resistance can be calculated according to Ohm's law. DC voltages up to 350 volts are thus available with the circuit described.

The following values have been utilized:

CAPACITORS

| 14 | 1 mfd | 52 | 2 mfd |
| 37 | 0.6 mfd | 54 | 2 mfd |
| | 0.002 .002 mfd | 62 | 2 mfd |
| 45 | 2 mfd | | |

RESISTORS

| 32 | 10 ohms | 66 | 500,00 ohms |
| 57a | 10,000 ohms | 67 | 50 ohms |

MISCELLANEOUS 11, 12 Tung Sol ET6 Transistors
17 Eveready 409 (6V) Battery
61 Sarkes Tarzian M500 or Pacific Semiconductor TP400 Diodes
65 1,000 ohms per volt Meter Although various minor modifications might be suggested by those versed in the art, it should be understood that I wish to embody within the scope of the patent warranted hereon all such embodiments as reasonably and properly come within the scope of my contribution to the art.

I claim:

1. An AC pulse generator for providing fault-detection signals, comprising:
   a. a multivibrator circuit;
   b. an output transformer having a center-tapped winding forming a part of said multivibrator circuit and a secondary winding connected to output terminal means; and
   c. at least one capacitive connection extending through said secondary winding from one end of said first-mentioned winding to its center-tap, providing a capacitive shunt across such section of this winding to render the multivibrator circuit asymmetrical.

2. An AC pulse generator according to claim 1, wherein said multivibrator circuit is of the astable type and having two quasi-stable states normally operative to switch periodically from one of said states to the other, and having a third state of stability intermediate said quasi-stable states, said third state being upset by said capacitive connection.

3. An AC pulse generator according to claim 1, comprising in further combination a capacitor connected across said center tapped winding whereby said multivibrator circuit has an alternating output of nonsinusoidal wave form with at least one pip per cycle.

4. An AC pulse generator according to claim 1, having at least one additional secondary winding in said transformer; and a multiposition selector switch connected between said windings and said output terminal means.

5. An AC pulse generator according to claim 4, including a battery for directly driving said multivibrator circuit; and said selector switch being of the ganged type having a plurality of positions for connecting said battery to said multivibrator circuit to power it while also connecting a selected one of said windings of appropriate impedance to said output terminal means.

6. An AC pulse generator according to claim 1, wherein said transformer has a secondary winding for providing a relatively high voltage, and rectifier means including capacitors connected to the last-mentioned secondary winding for providing high voltage direct current to said output terminal means.

7. An AC pulse generator according to claim 6, wherein an additional capacitive connection is provided between one end of said primary winding and its center-tap, which capacitive connection includes one of said capacitors of said rectifier means.